United States Patent
Cheng et al.

(10) Patent No.: US 11,411,887 B2
(45) Date of Patent: Aug. 9, 2022

(54) METHOD AND DEVICE FOR PERFORMING TRAFFIC CONTROL ON USER EQUIPMENT

(71) Applicant: SHANGHAI SHANGWANG NETWORK TECHNOLOGY CO., LTD., Shanghai (CN)

(72) Inventors: Han Cheng, Shanghai (CN); Xiaofeng Hu, Shanghai (CN)

(73) Assignee: SHANGHAI SHANGWANG NETWORK TECHNOLOGY CO., LTD., Shanghai (CN)

( * ) Notice: Subject to any disclaimer, the term of this patent is extended or adjusted under 35 U.S.C. 154(b) by 153 days.

(21) Appl. No.: 16/693,435

(22) Filed: Nov. 25, 2019

(65) Prior Publication Data

US 2020/0099631 A1    Mar. 26, 2020

Related U.S. Application Data

(63) Continuation of application No. PCT/CN2018/087228, filed on May 17, 2018.

(30) Foreign Application Priority Data

May 25, 2017  (CN) .......................... 201710381275.8

(51) Int. Cl.
| | |
|---|---|
| *H04L 47/80* | (2022.01) |
| *H04L 47/70* | (2022.01) |
| *H04L 61/5007* | (2022.01) |
| *H04W 8/24* | (2009.01) |

(52) U.S. Cl.
CPC .......... *H04L 47/808* (2013.01); *H04L 47/824* (2013.01); *H04L 61/2007* (2013.01); *H04W 8/24* (2013.01)

(58) Field of Classification Search
CPC . H04L 61/2007; H04L 47/824; H04L 47/821; H04L 47/808; H04W 48/16; H04W 48/06; H04W 8/24; H04W 28/20
See application file for complete search history.

(56) References Cited

U.S. PATENT DOCUMENTS

| | | | |
|---|---|---|---|
| 9,749,946 B2 * | 8/2017 | Wang | H04W 36/00837 |
| 2009/0213799 A1 * | 8/2009 | Yeo | H04L 61/6022 |
| | | | 370/328 |
| 2011/0268052 A1 * | 11/2011 | Koc | H04L 5/003 |
| | | | 370/329 |
| 2015/0148026 A1 * | 5/2015 | Doumi | H04W 88/18 |
| | | | 455/418 |
| 2015/0271176 A1 * | 9/2015 | Wei | H04W 52/0209 |
| | | | 455/411 |
| 2016/0021150 A1 * | 1/2016 | Larkin | H04L 65/1016 |
| | | | 709/225 |

(Continued)

*Primary Examiner* — Redentor Pasia
(74) *Attorney, Agent, or Firm* — Bayramoglu Law Offices LLC

(57) ABSTRACT

A method for performing traffic control on user equipment accessing a wireless access point includes: determining identity type information of user equipment, the user equipment being connected to a shared wireless access point provided by a wireless routing device; and preferentially scheduling traffic of the user equipment if the identity type information of the user equipment indicates that the user equipment is a preferred device, the preferred device including an owner's device of a provider of the wireless routing device.

20 Claims, 3 Drawing Sheets

(56) References Cited

U.S. PATENT DOCUMENTS

| | | | |
|---|---|---|---|
| 2016/0043953 A1* | 2/2016 | Ringland | H04L 47/20 |
| | | | 370/230 |
| 2016/0315973 A1* | 10/2016 | Harp | H04L 63/08 |
| 2017/0295591 A1* | 10/2017 | Nguyen | H04W 28/08 |
| 2018/0115964 A1* | 4/2018 | Lin | H04W 72/1242 |
| 2019/0174360 A1* | 6/2019 | Pang | H04W 72/1226 |

* cited by examiner

METHOD AND DEVICE FOR PERFORMING TRAFFIC CONTROL ON USER EQUIPMENT

CROSS REFERENCE TO THE RELATED APPLICATIONS

This application is the continuation application of International Application No. PCT/CN2018/087228, filed on May 17, 2018, which is based upon and claims priority to Chinese Patent Application No. 201710381275.8, filed on May 25, 2017, the entire contents of which are incorporated herein by reference.

BACKGROUND

Technical Field

This application relates to the communications field, and in particular, to a technology of performing traffic control on user equipment accessing a wireless access point.

Background

Currently, utilization of home broadband is not high. A main reason why an owner does not share a wireless access point is that after sharing, a network speed of the owner may be affected when another user uses traffic. Currently, in order to prevent the network speed from being affected, the owner often hides an SSID of the wireless access point to prevent the wireless access point from being connected. Consequently the utilization of the broadband is greatly reduced.

SUMMARY

This application is intended to provide a method for performing traffic control on user equipment accessing a wireless access point.

According to one aspect of this application, a method for performing, at a wireless routing device side, traffic control on user equipment accessing a wireless access point is provided. The method includes:

determining identity type information of user equipment, the user equipment being connected to a shared wireless access point provided by a wireless routing device; and preferentially scheduling traffic of the user equipment if the identity type information of the user equipment indicates that the user equipment is a preferred device, wherein the preferred device comprises an owner's device of a provider of the wireless routing device.

According to yet another aspect of this application, a method for performing, at a wireless routing device side, traffic control on user equipment accessing a wireless access point is provided. The method includes:

receiving a connection request of user equipment for a shared wireless access point provided by a wireless routing device, and allocating an IP address in a limited scheduling IP address field to the user equipment;

determining the device identification information of the user equipment;

reallocating an IP address in a priority scheduling IP address field to the user equipment if the identity type information of the user equipment indicates that the user equipment is an owner's device or a familiar device of a provider of the wireless routing device.

According to another aspect of this application, a method for performing, at a network device side, traffic control on user equipment accessing a wireless access point is provided. The method includes:

receiving a query request sent by a corresponding wireless routing device for identity type information of user equipment, wherein the query request comprises device identification information of the user equipment, and the user equipment is connected to a shared wireless access point provided by the wireless routing device;

determining the identity type information of the user equipment according to the wireless routing device and the device identification information of the user equipment; and returning the identity type information of the user equipment to the wireless routing device.

According to one aspect of this application, a method for performing traffic control on user equipment accessing a wireless access point is provided. The method includes:

sending, by a wireless routing device, a query request for identity type information of user equipment to a corresponding network device, wherein the query request includes device identification information of the user equipment, and the user equipment is connected to a shared wireless access point provided by the wireless muting device;

receiving, by the network device, the query request;

determining, by the network device, the identity type information of the user equipment according to the wireless routing device and the device identification information of the user equipment;

returning, by the network device, the identity type information of the user equipment to the wireless routing device;

receiving, by the wireless routing device, the identity type information; and preferentially scheduling, by the wireless routing device, traffic of the user equipment if the identity type information of the user equipment indicates that the user equipment is a preferred device, wherein the preferred device comprises an owner's device of a provider of the wireless routing device.

According to one aspect of this application, a device for performing, at a wireless routing device side, traffic control on user equipment accessing a wireless access point is provided. The device includes:

a processor; and a memory configured to store a computer executable instruction that when being executed, causes the processor to perform:

determining identity type information of user equipment, the user equipment being connected to a shared wireless access point provided by a wireless routing device; and preferentially scheduling traffic of the user equipment if the identity type information of the user equipment indicates that the user equipment is a preferred device, wherein the preferred device comprises an owner's device of a provider of the wireless routing device.

According to another aspect of this application, a device for performing, at a wireless routing device side, traffic control on user equipment accessing a wireless access point is provided. The device includes:

a processor; and a memory configured to store a computer executable instruction that when being executed, causes the processor to perform:

receiving a connection request of user equipment for a shared wireless access point provided by a wireless routing device, and allocating an IP address in a limited scheduling IP address field to the user equipment;

determining the device identification information of the user equipment;

reallocating an IP address in a priority scheduling LP address field to the user equipment if the identity type information of the user equipment indicates that the user equipment is an owner's device or a familiar device of a provider of the wireless routing devices.

According to another aspect of this application, a device for performing, at a network device side, traffic control on user equipment accessing a wireless access point is provided. The device includes:

a processor; and a memory configured to store a computer executable instruction that when being executed, causes the processor to perform:

receiving a query request sent by a corresponding wireless routing device for identity type information of user equipment, wherein the query request comprises device identification information of the user equipment, and the user equipment is connected to a shared wireless access point provided by the wireless routing device;

determining the identity type information of the user equipment according to the wireless routing device and the device identification information of the user equipment; and returning the identity type information of the user equipment to the wireless routing device.

According to one aspect of this application, a computer readable medium including an instruction is provided. The instruction, when being executed, causes a system perform the following operations:

determining identity type information of user equipment, the user equipment being connected to a shared wireless access point provided by a wireless routing device; and preferentially scheduling traffic of the user equipment if the identity type information of the user equipment indicates that the user equipment is a preferred device, wherein the preferred device comprises an owner's device of a provider of the wireless routing device.

According to another aspect of this application, a computer readable medium including an instruction is provided. The instruction, when being executed, causes a system to perform the following operations:

Receiving a connection request of user equipment for a shared wireless access point provided by a wireless routing device, and allocating an IP address in a limited scheduling IP address field to the user equipment;

determining the device identification information of the user equipment;

reallocating an IP address in a priority scheduling IP address field to the user equipment if the identity type information of the user equipment indicates that the user equipment is an owner's device or a familiar device of a provider of the wireless routing device.

According to another aspect of this application, a computer readable medium including an instruction is provided. The instruction, when being executed, causes a system to perform the following operations:

receiving a query request sent by a corresponding wireless routing device for identity type information of user equipment, wherein the query request comprises device identification information of the user equipment, and the user equipment is connected to a shared wireless access point provided by the wireless routing device;

determining the identity type information of the user equipment according to the wireless routing device and the device identification information of the user equipment; and returning the identity type information of the user equipment to the wireless routing device.

In comparison to the prior art, in this application, by identifying the user equipment connected to the wireless access point as the owner's device, the familiar device or the unfamiliar device connected to the wireless access point, traffic control is performed on different user equipment. For example, a network speed of the unfamiliar device is limited to not affect a network speed of an owner or an acquaintance. Therefore, a priority of the owner surfing the Internet is ensured, a user is encouraged to share a wireless access point of the user, and broadband utilization is improved.

BRIEF DESCRIPTION OF THE DRAWINGS

Other features, objectives, and advantages of this application will become more obvious by reading the detailed description of nonlimitative embodiments that is provided with reference to the following accompanying drawings.

The same or similar reference numerals in the drawings indicate the same or similar parts.

DETAILED DESCRIPTION OF THE EMBODIMENTS

Figure 1:
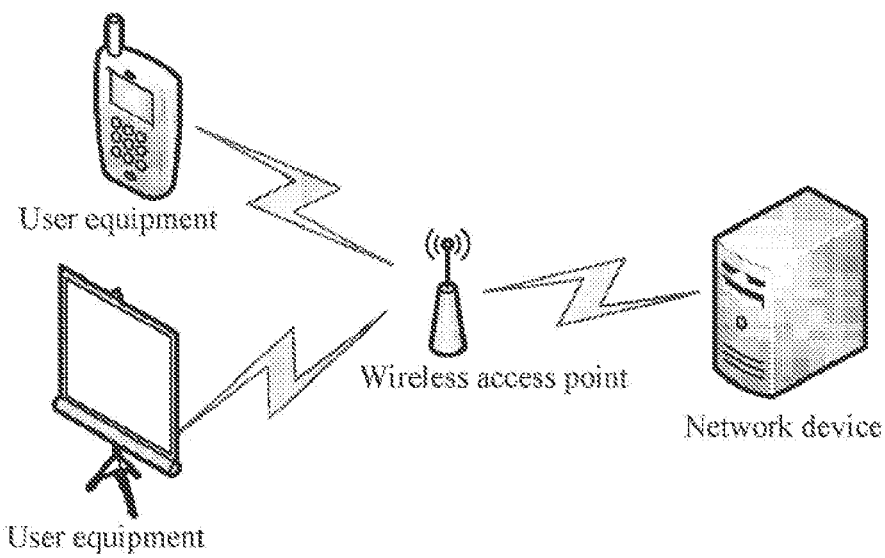
FIG. 1 is a topology diagram of a system for performing traffic control on user equipment accessing a wireless access point according to an embodiment of this application.

This application is further described below in detail with reference to the accompanying drawings.

In a typical configuration of this application, a terminal, a device of a service network, and a trusted party all include one or more processors (CPUs), an input/output interface, a network interface, and a memory.

The memory may include a form such as a persistent memory, a random-access memory (RAM) and/or a non-volatile memory of computer readable media, for example, a read-only memory (ROM) or a flash memory (RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of a storage medium of a computer include, but are not limited to, a phase-change memory (PRAM), a static random-access memory (SRAM), a dynamic random-access memory (PRAM), a RAM of another type, a ROM, an electrically erasable programmable read-only memory (EEPROM), a flash memory or another memory technology, a compact disc read-only memory (CD-ROM), a digital versatile disc (DVD) or another optical storage device, a cassette tape, disk and tape memory or another magnetic storage device, or any other non-transmission media, which may be configured to store information that can be accessed by a computing device.

The device in this application includes but is not limited to a user equipment, a network device, or a device formed by integrating the user equipment and the network device through a network. The user equipment includes, but is not limited to, any mobile electronic product that can perform human-computer interaction with a user (for example, human-computer interaction through a touchpad), such as a smart phone, a tablet computer, and the like, and the mobile electronic product can adopt any operating system, such as an android operating system, an iOS operating system, and the like. The network device includes an electronic device capable of automatically performing numerical calculation and information processing according to an instruction set or stored in advance, and hardware of the network device includes but is not limited to a microprocessor, an application specific integrated circuit (ASIC), a programmable logic device (PLD), a field programmable gate array (FPGA), a digital signal processor (DSP), an embedded device, and the like. The network device includes, but is not limited to, a computer, a network host, a single network server, a plurality of network server sets, or a cloud composed of a plurality of servers. In this case, the cloud is composed of a large quantity of computers or network servers based on cloud computing. Cloud computing is a type of distributed computing, and is a virtual supercomputer composed of a group of loosely coupled computer sets. The network includes, but is not limited to, the Internet, a wide area network, a metropolitan area network, a local area network, a VPN network, a wireless ad hoc network, and the like. Preferably, the device may also be a program run on the user equipment, the network device, or the user equipment and the network device, the network device, a touch terminal, or a device formed by integrating the network device and the touch terminal through a network.

Certainly, a person skilled in the art should understand that the above device is only an example, and other existing or future devices, if applicable to this application, shall also be included in the protection scope of this application and hereby incorporated by reference.

In the descriptions of this application, the meaning of "a plurality of" is two or more, unless otherwise explicitly and specifically defined.

FIG. 1 shows a typical application scenario of this application. User equipment is connected to a wireless access point. The wireless access point sends an identity information query request of the user equipment to a network device. The network device determines identity type information of the user equipment and returns the identity type information of the user equipment to the wireless access point. The wireless access point preferentially schedules traffic of the user equipment if the identity type information of the user equipment indicates that the user equipment is a preferred device.

Figure 2:
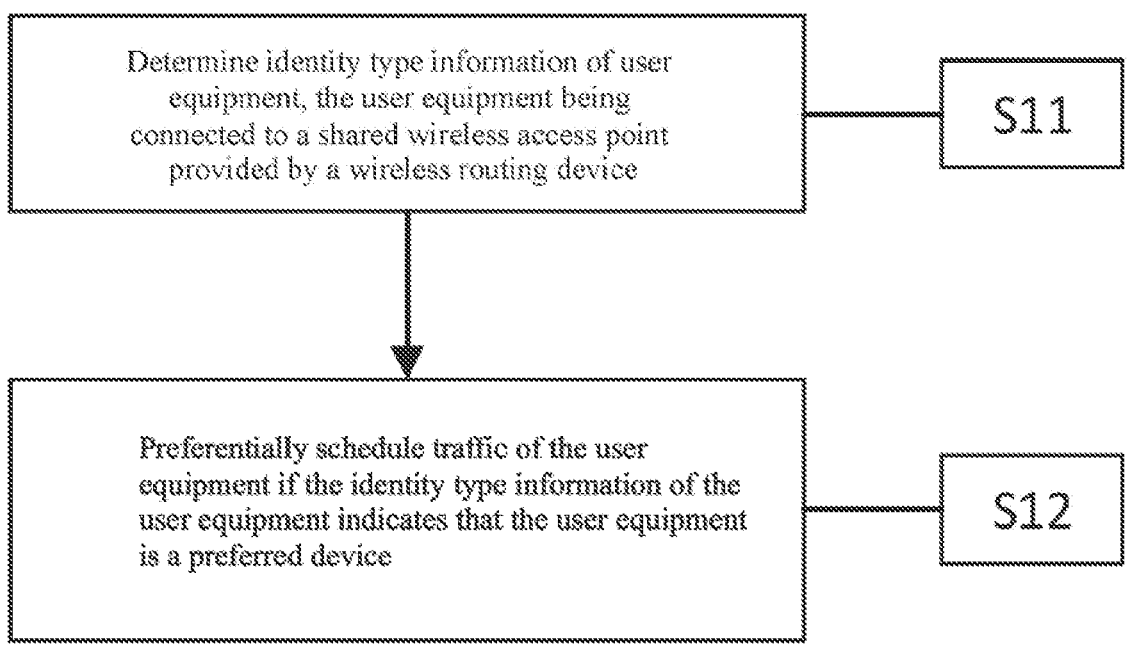
FIG. 2 is a flowchart of a method for performing, at a wireless routing device side, traffic control on user equipment accessing a wireless access point according to an embodiment of this application.

FIG. 2 shows a method for performing, at a wireless routing device side, traffic control on user equipment accessing a wireless access point according to an aspect of this application. The method includes step S11 and step S12. In step S11, the wireless routing device determines identity type information of the user equipment, the user equipment being connected to a shared wireless access point provided by the wireless routing device. In step S12, the wireless routing device preferentially schedules the traffic of the user equipment if the identity type information of the user equipment indicates that the user equipment is a preferred device, the preferred device including an owner's device of a provider of the wireless routing device.

Specifically, in step S11, the wireless routing device determines identity type information of the user equipment, the user equipment being connected to the shared wireless access point provided by the wireless routing device. For example, a wireless connection application is installed in user equipment operated by a user, and a first user account in the wireless connection application is logged in the user equipment, the wireless connection application being configured to connect the wireless access point provided by the wireless routing device. The user equipment is connected to the wireless access point provided by the wireless routing device. The wireless routing device corresponds to a second user account in the wireless connection application. The first user account is an account corresponding to the user equipment accessing the wireless access point in the wireless connection application, and the second user account is an account corresponding to the provider of the wireless routing device in the wireless connection application. Subsequently the wireless routing device detects whether the first user account in the user equipment and the second user account bound to the wireless routing device are a same account.

Subsequently, in step S12, the wireless routing device preferentially schedules the traffic of the user equipment if the identity type information of the user equipment indicates that the user equipment is a preferred device, the preferred device including, the owner's device of the provider of the wireless routing device. For example, if the first user account in the user equipment accessing the wireless access point and the second user account bound to the wireless routing device are the same account, the wireless routing device preferentially schedules the traffic of the user equipment, such as, setting a highest scheduling priority for a communication service of the user equipment, or reserving more bandwidth for the user equipment than other non-preferred devices, or limiting available bandwidth of non-preferred devices to a relatively small proportion (for example, 10%) of total bandwidth.

For example, a user U1 holds user equipment (for example, a mobile phone) UE1. The wireless connection application is installed in the user equipment UE1, and the first user account of the wireless connection application is logged in the user equipment UE1. The user equipment UE1 is connected to the wireless access point. The wireless routing device corresponds to the second user account in the wireless connection application. After receiving a connection request of the user equipment UE1, the wireless access point detects whether the first user account in the user equipment UE1 and the second user account are the same account. If it is detected that the first user account and the second user account are the same account, it is determined that the user equipment UE1 is the owner's device of the provider of the wireless routing device, that is, the identity type information of the user equipment UE1 indicates that the user equipment UE1 is the preferred device. Subsequently, the wireless routing device preferentially schedules traffic of the user equipment UE1.

Preferably, in step S12, if an identity type of the user equipment is a limited device, the wireless routing device further limits the scheduling of the traffic of the user equipment according to a traffic requirement of a preferred device in the wireless routing device. For example, when determining that the identity type of the user equipment is not the preferred device, or that the identity type of the user equipment is the limited device (for example, user equipment of an unfamiliar user), the wireless routing device may limit the scheduling of the traffic of the user equipment, such as, preferentially scheduling traffic of other user equipment whose identity type is a preferred device before processing the traffic of the user equipment, or allocating a small amount of bandwidth (for example, 10% of the total bandwidth) of the wireless routing device to traffic of the user equipment and other limited devices, and reserving a remaining large part of bandwidth of the wireless routing device for traffic of a preferred device. More preferably, the wireless routing device may also schedule, in combination with the traffic requirement of the preferred device, the traffic of the user equipment whose identity type is the limited device. For example, when all devices connected to the wireless routing device are limited devices, or a preferred device connected to the wireless routing device uses only an application with a relatively low bandwidth requirement, such as instant messaging application and web browsing application, the wireless routing device allocates more bandwidth (for example, 50% bandwidth) to traffic of the user equipment and other limited devices. For another example, when the wireless routing device is connected to much preferred devices, or a preferred device connected to the wireless routing device uses an application with a relatively high bandwidth requirement, such as video chat application and video watching application, the wireless routing device allocates less bandwidth (for example, 10% bandwidth) to traffic of the user equipment and other limited devices.

Figure 3:
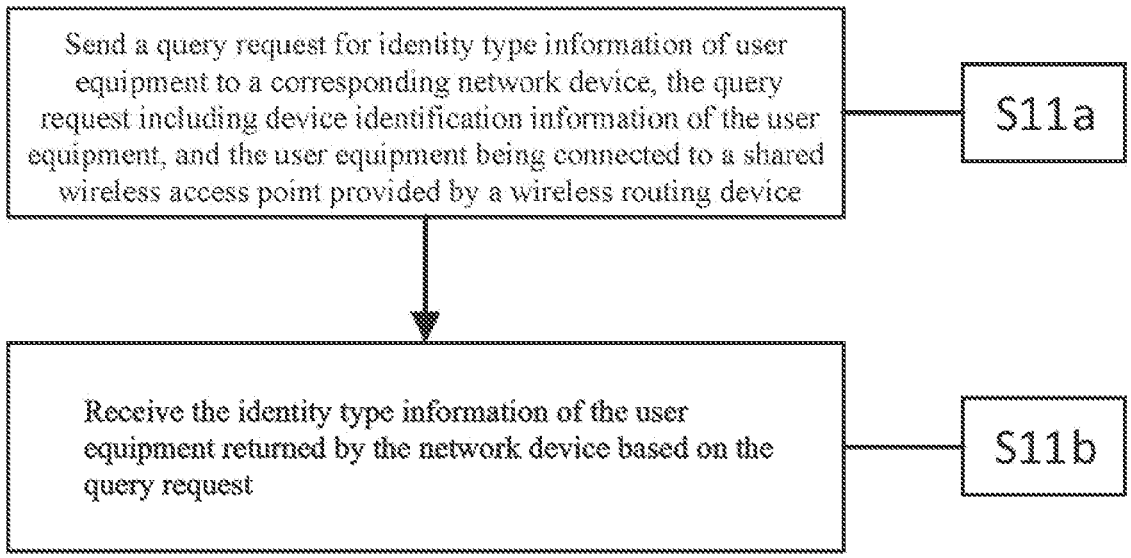
FIG. 3 shows a sub-step of a step in FIG. 2.

Preferably, FIG. 3 shows sub-step S11a and sub-step S11b of step S11. In step S11a, the wireless routing device sends a query request for the identity type information of the user equipment to a corresponding network device, the query request including device identification information of the user equipment, and the user equipment being connected to the shared wireless access point provided by the wireless routing device. In step S11b, the wireless routing device receives the identity type information of the user equipment returned by the network device based on the query request. For example, the wireless connection application is installed in the user equipment operated by the user, and the first user account of the wireless connection application is logged in the user equipment. The user equipment is connected to the wireless access point provided by the wireless routing device. The wireless routing device corresponds to the second user account in the wireless connection application. Subsequently the wireless routing device sends the query request for the identity type information of the user equipment to the corresponding network device, the query request including device identification information of the wireless routing device and the user equipment. After determining the identity type information of the user equipment, the network device sends feedback information to the wireless routing device. After receiving the feedback information, the wireless routing device determines the identity type information of the user equipment.

For example, a user U1 holds user equipment (for example, a mobile phone) UE1. The wireless connection application is installed in the user equipment UE1, and the user equipment UE1 is connected to the wireless access point provided by the wireless routing device. After receiving a connection request of the user equipment UE1, the wireless routing device sends a query request for identity type information of the user equipment UE1 to the corresponding network device, the query request including device identification information of the wireless routing device and the user equipment UE1. In a cloud database, the network device determines a first user account of the user equipment in the wireless connection application according to the identification information of the user equipment UE1 (for example, an MAC address of the user equipment), determines a second user account corresponding to the wireless routing device in the wireless connection application according to the identification information of the wireless routing device (for example, a sequence number of the wireless routing device), and detects whether the first account information and the second user account are a same account. If it is detected that the first user account and the second user account are the same account, it is determined that the user equipment UE1 is the owner's device of the provider of the wireless routing device, and the network device returns the identity type information of the user equipment UE1 indicating that the user equipment UE1 is a preferred device to the wireless routing device. After receiving the feedback information, the wireless routing device determines that the user equipment UE1 is the preferred device, and preferentially schedules traffic of the user equipment UE1.

Preferably, the preferred device further includes a familiar device of the provider of the wireless routing device. For example, the preferred device includes not only the owner's device of the provider of the wireless routing device, but also the familiar device of the provider of the wireless routing device, such as a device of a friend of the provider of the wireless routing device.

For example, a user U1 holds user equipment (for example, a mobile phone) UE1. The wireless connection application is installed in the user equipment UE1, and the user equipment UE1 is connected to the wireless access point provided by the wireless routing device. After receiving a connection request of the user equipment UE1, the wireless routing device sends a query request for identity type information of the user equipment UE1 to the corresponding network device, the query request including device identification information of the wireless routing device and the user equipment UE1. In the cloud database, the network device determines, a first user account corresponding to the user equipment UE1 in the wireless connection application according to the identification information of the user equipment UE1 (for example, an MAC address of the user equipment), determines a second user account of the provider of the wireless routing device in the wireless connection application according to the identification information of the wireless routing device (for example, the sequence number of the wireless routing device), and detects whether the first account information and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. After receiving the feedback information, the wireless routing device determines that the user equipment UE1 is the preferred device, and preferentially schedules traffic of the user equipment UE1.

Preferably, in step S12, the wireless routing device allocates an IP address of a priority scheduling IP address field to the user equipment if the identity type information of the user equipment indicates that the user equipment is the preferred device, the priority device including the owner's device of the provider of the wireless routing device. For example, if the first user account of the user equipment accessing the wireless access point and the second user account corresponding to the wireless routing device are the same account or in a friend relationship with each other, the wireless routing device allocates, to the user equipment, an IP address of a priority scheduling IP address field whose speed and traffic are not limited.

For example, a user U1 holds user equipment (for example, a mobile phone) UE1. The wireless connection application is installed in the user equipment UE1, and the user equipment UE1 is connected to the wireless access point provided by the wireless routing device. After receiving a connection request of the user equipment UE1, the wireless routing device sends a query request for identity type information of the user equipment UE1 to the corresponding network device, the query request including device identification information of the wireless routing device and the user equipment UE1. In the cloud database, the network device determines, a first user account corresponding to the user equipment UE1 in the wireless connection application according to the identification information of the user equipment UE1 (for example, an MAC address of the user equipment), determines a second user account corresponding to the provider of the wireless routing device in the wireless connection application according to the identification information of the wireless routing device (for example, the sequence number of the wireless routing device), and detects whether the first account information and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. After receiving the feedback information, the wireless routing device determines that the user equipment UE1 is the preferred device, and the wireless routing device allocates, to the user equipment UE1, the IP address of the priority scheduling IP address field whose speed and traffic are not limited.

Preferably, in step S12, if the identity type of the user equipment is the limited device, the wireless routing device further allocates an IP address in a limited scheduling IP address field to the user equipment. For example, if the first user account of the user equipment accessing the wireless access point and the second user account corresponding to the wireless routing device are not the same account and are not in a friend relationship, the wireless routing device allocates, to the user equipment, an IP address of a limited scheduling IP address field whose speed and traffic are limited.

For example, a user U1 holds user equipment (for example, a mobile phone) UE1. The wireless connection application is installed in the user equipment UE1, and the user equipment UE1 is connected to the wireless access point provided by the wireless routing device. After receiving a connection request of the user equipment UE1, the wireless access point sends a query request for identity type information of the user equipment UE1 to the corresponding network device, the query request including device identification information of the wireless routing device and the user equipment UE1. In the cloud database, the network device determines a first user account corresponding to the user equipment UE1 in the wireless connection application according to the identification information of the user equipment UE1 (for example, an MAC address of the user equipment), determines a second user account corresponding to the provider of the wireless routing device in the wireless connection application according to the identification information of the wireless routing device (for example, the sequence number of the wireless routing device), and detects whether the first account information and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. Alternatively, if it is detected that the first user account and the second user account are not the same account and are not in the friend relationship with each other, it is determined that the user equipment UE1 is an unfamiliar device of the wireless routing device, and the network device returns the identity type information of the user equipment UE1 indicating that the user equipment UE1 is a limited device to the wireless routing device. After receiving the feedback information, if the wireless routing device determines that the user equipment UE1 is the preferred device, the wireless routing device allocates, to the user equipment UE1, the IP address of the priority scheduling IP address field whose speed and traffic are not limited. Alternatively, after receiving the feedback information, if the wireless routing device determines that the user equipment UE1 is the limited device, the wireless routing device allocates, to the user equipment UE1, the IP address of the limited scheduling IP address field whose speed and traffic are limited.

Figure 4:
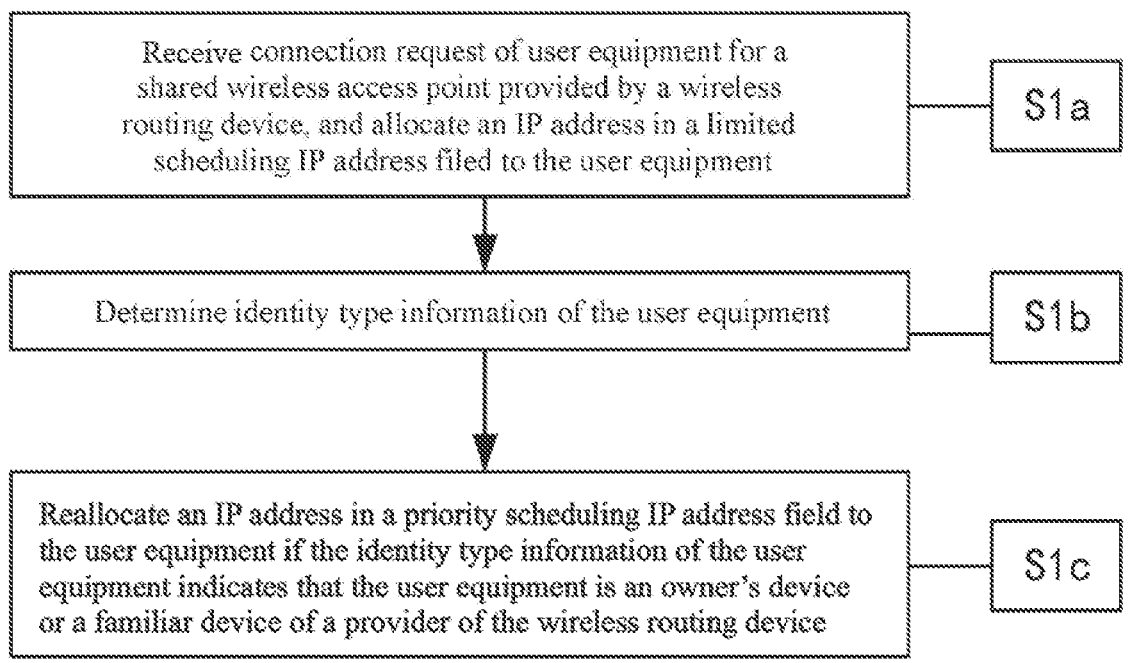
FIG. 4 is a flowchart of a method for performing, at a wireless routing device side, traffic control on user equipment accessing a wireless access point according to an embodiment of this application.

FIG. 4 shows a method for performing, at a wireless routing device side, traffic control on user equipment according to this application. The method includes step S1a, step S1b and step S1c. In step S1a, the wireless routing device receives a connection request, of the user equipment, for a shared wireless access point provided by the wireless routing device, and allocates an IP address in a limited scheduling IP address field to the user equipment. In step S1b, the wireless routing device determines identity type information of the user equipment. Subsequently, in step S1c, the wireless routing device reallocates an IP address in a priority scheduling IP address field to the user equipment if the identity type information of the user equipment indicates that the user equipment is an owner's device or a familiar device of a provider of the wireless routing device. For example, the wireless routing device receives the connection request, of the user equipment, for the shared wireless access point provided by the wireless routing device, and an IP address in a limited scheduling IP address field whose traffic and speed are limited is allocated to the user equipment alter the user equipment is connected to the wireless access point. The user equipment corresponds to a first user account in a wireless connection application, and the wireless routing device corresponds to a second user account in the wireless connection application. The wireless routing device detects whether the first user account and the second user account are a same account or in a friend relationship with each other. If it is detected that the first user account and the second user account are the same account or in the friend relationship with each other, it is determined that the user equipment is a preferred device, that is, it is determined that the identity type information of the user equipment indicates that the user equipment is the owner's device or the familiar device of the provider of the wireless routing device, and the wireless routing device reallocates, to the user equipment, an IP address in a priority scheduling IP address field whose speed and traffic are not limited.

For example, a user U1 holds user equipment (for example, a mobile phone) UE1. The wireless connection application is installed in the user equipment UE1, and the user equipment UE1 is connected to the wireless access point provided by the wireless routing device. After the wireless access point receives a connection request of the user equipment UE1, the wireless routing device allocates, to the user equipment UE1, the IP address in the IP field whose speed and traffic are limited. Subsequently the wireless routing device sends a query request for identity type information of the user equipment UE1 to a corresponding network device, the query request including device identification information of the wireless routing device and the user equipment UE1. In a cloud database, the network device determines a first user account corresponding to the user equipment UE1 in the wireless connection application according to the identification information of the user equipment UE1 (for example, an MAC address of the user equipment), determines a second user account corresponding to the provider of the wireless routing device in the wireless connection application according to the identification information of the wireless routing device (for example, a sequence number of the wireless routing device), and detects whether the first account information and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. Alternatively, if it is detected that the first user account and the second user account are not the same account and are not in the friend relationship with each other, it is determined that the user equipment UE1 is an unfamiliar device of the wireless routing device, and the network device returns the identity type information of the user equipment UE1 indicating that the user equipment is a limited device to the wireless muting device. After receiving the feedback information, if the wireless routing device determines that the user equipment UE1 is the preferred device, the wireless routing device reallocates, to the user equipment UE1, the IP address of the priority scheduling IP address field whose speed and traffic are not limited. Alternatively, after receiving the feedback information, if the wireless routing device determines that the user equipment UE1 is the limited device, the wireless routing device maintains allocation, to the user equipment UE1, of the IP address of the limited scheduling IP address field whose speed and traffic are limited.

Figure 5:
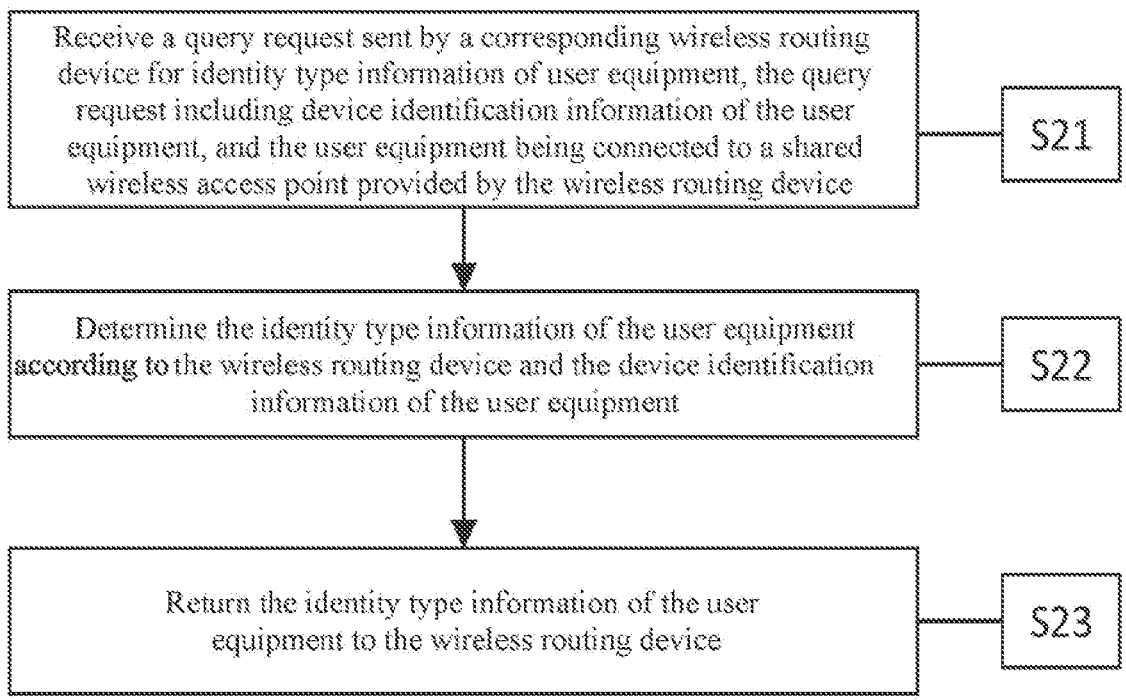
FIG. 5 is a flowchart of a method for performing, at a network device side, traffic control on user equipment accessing a wireless access point according to another embodiment of this application.

FIG. 5 shows a method for performing, at a network device side, traffic control on user equipment according to this application. The method includes step S21, step S22 and step S23. In step S21, the network device receives a query request, sent by a corresponding wireless routing device, for identity type information of the user equipment, the query request including device identification information of the user equipment, and the user equipment being connected to a shared wireless access point provided by the wireless routing device. Subsequently, in step S22, the network device determines the identity type information of the user equipment according to the wireless routing device and the device identification information of the user equipment. Finally, in step S23, the network device returns the identity type information of the user equipment to the wireless routing device. For example, the network device receives the query request, sent by the corresponding wireless routing device, for the identity type information of the user equipment, the query request including device identification information of the user equipment and the wireless routing device, and the user equipment being connected to the shared wireless access point provided by the wireless routing device. The network device determines first user account information corresponding to the user equipment in a wireless connection application according to the identification information of the user equipment, and determines second user account information corresponding to the wireless routing device in the wireless connection application according to the identification information of the wireless routing device. Subsequently the network device detects whether the first user account information matches the second user account information, and if a first user account matches a second user account, the network device determines that the user equipment is an owner's device or a familiar device of a provider of the wireless routing device; alternatively if the first user account does not match the second user account, the network device determines that the user equipment is an unfamiliar device of the wireless routing device. The network device feeds back the identity type information of the user equipment to the wireless routing device based on a determined relationship.

For example, a user U1 holds user equipment (for example, a mobile phone) UE1. The wireless connection application is installed in the user equipment UE1, and the user equipment UE1 is connected to the wireless access point provided by the wireless routing device. After the wireless access point receives a connection request of the user equipment UE1, the wireless routing device allocates, to the user equipment UE1, the IP address in the IP field whose speed and traffic are limited. Subsequently the wireless routing device sends a query request for identity type information of the user equipment UE1 to a corresponding network device, the query request including device identification information of the wireless routing device and the user equipment UE1. In a cloud database, the network device determines a first user account corresponding to the user equipment in the wireless connection application according to the identification information of the user equipment UE1 (for example, an MAC address of the user equipment), determines a second user account corresponding to the provider of the wireless routing device in the wireless connection application according to the identification information of the wireless routing device (for example, a sequence number of the wireless routing device), and detects whether the first user account and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. Alternatively, if it is detected that the first user account and the second user account are not the same account and are not in the friend relationship with each other, it is determined that the user equipment UE1 is an unfamiliar device of the wireless routing device, and the network device returns the identity type information of the user equipment UE1 indicating that the user equipment UE1 is a limited device to the wireless routing device. After receiving the feedback information, if the wireless routing device determines that the user equipment UE1 is the preferred device, the wireless routing device reallocates, to the user equipment UE1, the IP address of the priority scheduling IP address field whose speed and traffic are not limited. Alternatively, after receiving the feedback information, if the wireless routing device determines that the user equipment UE1 is the limited device, the wireless routing device maintains allocation, to the user equipment UE1, of the IP address of the limited scheduling IP address field whose speed and traffic are limited.

Preferably, in step S22, the network device performs a matching query in the owner's device of the provider of the wireless routing device according to n the identification information of the user equipment, and if the query is hit, the network device determines that the identification type information of the user equipment indicates that the user equipment is the owner's device of the provider of the wireless routing device. For example, in the cloud database, the network device performs matching query on the first user account corresponding to the user equipment according to the identification information of the user equipment, performs the matching query in the owner's device of the provider of the wireless routing device, and queries whether an owner's device account and the first user account corresponding to the user equipment are a same account. If it is obtained through querying that the owner's device account and the first user account corresponding to the user equipment are the same account, the network device determines that the identity type information of the user equipment indicates that the user equipment is the owner's device of the provider of the wireless routing device.

For example, a user U1 holds user equipment (for example, a mobile phone) UE1. The wireless connection application is installed in the user equipment UE1, and the user equipment UE1 is connected to the wireless access point provided by the wireless routing device. After the wireless access point receives a connection request of the user equipment UE1, the wireless routing device allocates, to the user equipment UE1, the IP address in the IP field whose speed and traffic are limited. Subsequently the wireless routing device sends a query request for identity type information of the user equipment UE1 to the corresponding network device, the query request including device identification information of the wireless routing device and the user equipment UE1. In a cloud database, the network device determines a first user account corresponding to the user equipment according to the identification information of the user equipment UE1 (for example an MAC address of the user equipment), and the network device may perform a query in the owner's device corresponding to the wireless routing device, to determine whether an owner's device account and the first user account are a same account. If it is obtained through querying that the owner's device account and the user equipment account are the same account, the network device determines that the identity type information of the user equipment indicates that the user equipment is the owner's device of the provider of the wireless routing device, and the network device feeds back the identity type information of the user equipment indicating that the user equipment is a preferred device to the wireless routing device. The network device may further determine a second user account corresponding to the provider of the wireless routing device in the wireless connection application according to the identification information of the wireless routing device (for example, the sequence number of the wireless routing device), and detect whether the first user account and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. Alternatively, if it is detected that the first user account and the second user account are not the same account and are not in the friend relationship with each other, it is determined that the user equipment UE1 is an unfamiliar device of the wireless routing device, and the network device returns the identity type information of the user equipment UE1 indicating that the user equipment UE1 is a limited device to the wireless routing device After receiving the feedback information, if the wireless routing device determines that the user equipment UE1 is the preferred device, the wireless routing device reallocates, to the user equipment UE1, the IP address of the priority scheduling IP address field whose speed and traffic are not limited. Alternatively, after receiving the feedback information, it the wireless routing device determines that the user equipment UE1 is the limited device, the wireless routing device maintains allocation, to the user equipment UE1, of the IP address of the limited scheduling IP address field whose speed and traffic are limited.

Preferably, step S22 includes sub-step S22a (not shown) and sub-step S22b (not shown). In sub-step S22a, the network device determines the first user account corresponding to the user equipment according to the device identification information of the user equipment and a mapping relationship between a user and a device, wherein the first user account corresponding to the user equipment in the mapping relationship between a user and a device. Subsequently, in step S22b, the network device determines the identity type information of the user equipment according to the second user account of the wireless routing device and the first user account. For example, the network device determines, the first user account corresponding to the user equipment according to the device identification information of the user equipment and a mapping relationship that is stored in the cloud database and that is between user equipment identification information and a user. Subsequently the network device detects whether the first user account matches the second user account of the wireless routing device, to determine the identity type information of the user equipment. If it is detected that the first user account matches the second user account, it is determined that the user equipment is the owner's device or the familiar device of the provider of the wireless routing device. Alternatively, if it is detected that the first user account and the second user account are not the same account and are not in the friend relationship with each other, it is determined that the user equipment is an unfamiliar device of the provider of the wireless routing device.

For example, a user U1 holds user equipment (for example, a mobile phone) UE1. The wireless connection application is installed in the user equipment UE1, and the user equipment UE1 is connected to the wireless access point provided by the wireless routing device. After the wireless access point receives a connection request of the user equipment UE1, the wireless routing device allocates, to the user equipment UE1, the IP address in the IP field whose speed and traffic are limited. Subsequently the wireless routing device sends a query request for identity type information of the user equipment. UE1 to the corresponding network device, the query request including device identification information of the wireless routing device and the user equipment UE1. The network device determines a first user account corresponding to the user equipment, according to the identification information of the user equipment UE1 (for example, an MAC address of the user equipment) and a mapping relationship that is stored in the cloud database and that is between the user equipment UE1 and a user U1, and the network device may perform a query in the owner's device corresponding to the wireless routing device, to determine whether the owner's device account and the first user account are a same account. If it is obtained through querying that the owner's device account and the user equipment account are the same account, the network device determines that the identity type information of the user equipment indicates that the user equipment is the owner's device of the provider of the wireless routing device, and the network device feeds back the identity type information of the user equipment indicating that the user equipment is a preferred device to the wireless routing device. The network device may further determine a second user account corresponding to the provider of the wireless routing device in the wireless connection according to the identification information of the wireless routing device (for example, the sequence number of the wireless routing device), and detect whether the first user account and the second user account are a same account or in a friend relationship with each other. If it is detected that the first user account and the second user account are the same account or in the friend relationship with each other, it is determined that the user equipment UE1 is the owner's device or the familiar device of the provider of the wireless routing device, and the network device returns the identity type information of the user equipment UE1 indicating that the user equipment UE1 is a preferred device to the wireless routing device. Alternatively, if it is detected that the first user account and the second user account are not the same account and are not in the friend relationship with each other, it is determined that the user equipment UE1 is an unfamiliar device of the wireless routing device, and the network device returns the identity type information of the user equipment UE1 indicating that the user equipment is a limited device, to the wireless routing device. After receiving the feedback information, if the wireless routing device determines that the user equipment UE1 is the preferred device, the wireless routing device reallocates, to the user equipment UE1, the IP address of the priority scheduling IP address field whose speed and traffic are not limited. Alternatively, after receiving the feedback information, if the wireless routing device determines that the user equipment. UE1 is the limited device, the wireless routing device maintains allocation, to the user equipment UE1, of the IP address of the limited scheduling IP address field whose speed and traffic are limited.

Preferably, in step S22*b*, the network device determines the identity type information of the user equipment according to the second user account that corresponds to the wireless routing device and the first user account and according to an identity determining rule. The identity determining rule includes at least one of the following: if the first user account and the second user account correspond to a same user, the network device determines that the identity type information of the user equipment indicates that the user equipment is the owner's device of the provider of the wireless routing device; if the first user account and the second user account are in the friend relationship, the network device determines that the identity type information of the user equipment indicates that the user equipment is the familiar device of the provider of the wireless routing device; if the first user account and the second user account correspond to different users and are not in the friend relationship, the network device determines that the identity type information of the user equipment indicates that the user equipment is the limited device. For example, the network device determines the first user account corresponding to the user equipment and the second user account corresponding to the wireless routing device, and performs matching according to the identity determining rule, to determine the identity type information of the user equipment. Wherein the two user accounts belong to a same application, and the identity determining rule includes at least one of the following: if the first user account and the second user account correspond to a same user, the network device determines that the identity type information of the user equipment indicates that the user equipment is the owner's device of the provider of the wireless routing device; if the first user account and the second user account are in the friend relationship, the network device determines that the identity type information of the user equipment indicates that the user equipment is the familiar device of the provider of the wireless routing device; if the first user account and the second user account are different users and are not in the friend relationship, the network device determines that the identity type information of the user equipment indicates that the user equipment is an unfamiliar device, that is, the limited device.

For example, a user U1 holds user equipment (for example, a mobile phone) UE1. The wireless connection application is installed in the user equipment UE1, and the user equipment UE1 is connected to the wireless access point provided by the wireless routing device. After the wireless access point receives a connection request of the user equipment UE1, the wireless routing device allocates, to the user equipment UE1, the IP address in the IP field whose speed and traffic are limited. Subsequently the wireless routing device sends a query request for identity type in of the user equipment UE1 to the corresponding network device, the query request including device identification information of the wireless routing device and the user equipment UE1. The network device determines a first user account corresponding to the user equipment according to the identification information of the user equipment UE1 (for example, an MAC address of the user equipment) and a mapping relationship that is stored in the cloud database and that is between the user equipment UE1 and a user U1, and the network device may perform a query in the owner's device corresponding to the wireless routing device, to determine Whether the owner's device account and the first user account are a same account. If it is obtained through querying that the owner's device account and the user equipment account are the same account, the network device determines that the identity type information of the user equipment indicates that the user equipment is the owner's device of the provider of the wireless routing device, and the network device feeds back the identity type information of the user equipment indicating that the user equipment is a preferred device to the wireless routing device. The network device may further determine a second user account corresponding to the wireless routing device based on the identification information of the wireless routing device (for example, the sequence number of the wireless routing device), and perform matching according to the identity determining rule, to determine the identity type information of the user equipment UE1. Wherein both the first user account and the second user account belong to the wireless connection application. If it is detected that the first user account and the second user account are a same account, it is determined that the user equipment UE1 is the owner's device of the provider of the wireless routing device, and the network device returns the identity type information of the user equipment UE1 indicating that the user equipment UE1 is the owner's device to the Wireless routing device. If it is detected that the first user account and the second user account are in a friend relationship, it is determined that the user equipment UE1 is the familiar device of the provider of the wireless routing device, and the network device returns the identity type information of the user equipment UE1 indicating that the user equipment UE1 is the familiar device to the wireless routing device. If it is detected that the first user account and the second user account are different accounts and are not in the friend relationship, it is determined that the user equipment UE1 is the unfamiliar device of the wireless routing device, and the network device returns the identity type information of the user equipment UE1 indicating that the user equipment UE1 is the limited device to the wireless routing device. After receiving the feedback information, if the wireless routing device determines that the user equipment UE1 is the owner's device or the familiar device, that is, the preferred device, the wireless routing device reallocates, to the user equipment UE1, the IP address of the priority scheduling IP address field whose speed and traffic are not limited. Alternatively, after receiving the feedback information, if the wireless routing device determines that the riser equipment UE1 is the unfamiliar device, that is, the limited device, the wireless routing device maintains allocation, to the user equipment UE1, of the IP address of the limited scheduling IP address field whose speed and traffic are limited.

Preferably, the method further includes step S20 (not shown). In step S20, when a login log includes that a user logs into the wireless connection application in the user equipment by using the first user account, the network device establishes a correspondence between the user equipment and the first user account, to establish or update the mapping relationship between a user and a device. For example, when the wireless connection application is logged in in the user equipment, the user equipment records and uploads a mapping relationship between the user equipment and the user account, and the network device stores a correspondence between the user equipment and the user account.

For example, a user U1 holds user equipment (for example, a mobile phone) UE1. The wireless connection application is installed in the user equipment. UE1, and the user equipment UE1 is connected to the wireless access point provided by the wireless routing device. In a login log of the user equipment UE1, if the user equipment logs, in the wireless connection application, in a first user account, the network device establishes a correspondence (for example, U1:UE1) between user equipment identification in (for example, an MAC address of the user equipment) and the first user account. Alternatively, if there is already a correspondence between user equipment identification information and other user accounts, a correspondence between the user equipment identification information and a first user account is established, to update the correspondence between the user equipment identification information and the other user accounts.

After the wireless access point receives a connection request of the user equipment UE1, the wireless routing device allocates, to the user equipment UE1, the IP address in the IP field whose speed and traffic are limited. Subsequently the wireless routing device sends a query request for identity type information of the user equipment UE1 to the corresponding network device, the query request including device identification information of the wireless routing device and the user equipment UE1. The network device determines the first user account corresponding to the user equipment according to the identification information of the user equipment UE1 (for example, the MAC address of the user equipment) and the correspondence (U1:UE1) that is stored in the cloud database and that is between the user equipment UE1 and a user U1, and the network device may perform a query in a login log of the owner's device corresponding to the wireless routing device, to determine whether an owner's device account logged in the owner's device and the first user account are a same account. If it is obtained through querying that the owner's device account and the user equipment account are the same account, the network device determines that the identity type information of the user equipment indicates that the user equipment is the owner's device of the provider of the wireless routing device, and the network device feeds back the identity type information of the user equipment indicating that the user equipment is a preferred device to the wireless routing device. The network device may further determine the second user account corresponding to the wireless routing device according to the identification information of the wireless routing device (for example, the sequence number of the wireless routing device), and perform matching according to the identity determining rule, to determine the identity type information of the user equipment UE1. Wherein both the first user account and the second user account belong to the wireless connection application. If it is detected that the first user account and the second user account are a same account, it is determined that the user equipment UE1 is the owner's device of the provider of the wireless routing device, and the network device returns the identity type information of the user equipment UE1 indicating that the user equipment UE1 is the owner's device to the wireless routing device. If it is detected that the first user account and the second user account are in a friend relationship, it is determined that the user equipment UE1 is the familiar device of the provider of the wireless routing device, and the network device returns the identity type information of the user equipment UE1 indicating that the user equipment UE1 is the familiar device to the wireless routing device. If it is detected that the first user account and the second user account are different accounts and are not in the friend relationship, it is determined that the user equipment. UE1 is the unfamiliar device of the wireless routing device, and the network device returns the identity type information of the user equipment UE1 indicating that the user equipment is the limited device to the wireless routing device. After receiving the feedback information, if the wireless routing device determines that the user equipment UE1 is the owner's device or the familiar device, that is, the preferred device, the wireless routing device reallocates, to the user equipment UE1, the IP address of the priority scheduling IP address field whose speed and traffic are not limited. Alternatively, after receiving the feedback information, if the wireless routing device determines that the user equipment UE1 is the unfamiliar device, that is, the limited device, the wireless routing device maintains allocation, to the user equipment UE1, of the IP address of the limited scheduling IP address field whose speed and traffic are limited.

Preferably, in step S22b, the network device further determines the second user account corresponding to the wireless routing device according to a third user account corresponding to the wireless routing device. The first user account and the second user account belong to the same application, and the second user account and the third user account belong to different applications. Subsequently the network device determines the identity type information of the user equipment according to the first user account and the second user account. For example, the network device determines the third user account bound to the wireless routing device in a wireless routing device identification application (an application bound using identification information such as the sequence number of the wireless routing device) according to the identification information of the wireless routing device (for example, the sequence number of the wireless routing device), and then determines, in the wireless connection application, the second user account corresponding to the third user account, that is, the second user account corresponding to the wireless routing device. Subsequently the network device determines the identity type information of the user equipment according to the first user account and the second user account and the identity determining rule.

For example, a user U1 holds user equipment (for example, a mobile phone) UE1. The wireless connection application is installed in the user equipment UE1, and the user equipment UE1 is connected to the wireless access point provided by the wireless routing device. In a login log of the user equipment UE1, if the user equipment logs, in the wireless connection application, in a first user account, the network device establishes a correspondence (for example, U1:UE1) between user equipment identification information (for example, an MAC address of the user equipment) and the first user account. After the wireless access point receives a connection request of the user equipment UE1, the wireless routing device allocates, to the user equipment UE1, the IP address in the IP field whose speed and traffic are limited. Subsequently the wireless routing device sends a query request, for identity type information of the user equipment. UE1 to the corresponding network device, the query request including device identification information of the wireless routing device and the user equipment UE1. The network device determines the first user account corresponding to the user equipment according to the identification information of the user equipment UE1 (for example, the MAC address of the user equipment) and the correspondence U1:UE1) that is stored in the cloud database and that is between the user equipment UE1 and a user U1, and the network device may perform a query in a login log of the owner's device corresponding to the wireless routing device, to determine whether an owner's device account logged in the owner's device and the first user account are a same account. If it is obtained through querying that the owner's device account and the user equipment account are the same account, the network device determines that the identity type information of the user equipment indicates that the user equipment is the owner's device of the provider of the wireless routing device, and the network device feeds back the identity type information of the user equipment indicating that the user equipment is a preferred device to the wireless routing device. The network device may further determine the third user account bound to the wireless routing device in the wireless routing device identification application according to the identification information of the wireless routing device (for example, the sequence number of the wireless routing device), and then determine, in the wireless connection application, the second user account bound to the third user account, that is, determining the second user account corresponding to the wireless routing device in the wireless connection application, and perform matching according to the identity determining rule, to determine the identity type information of the user equipment UE1. Wherein both the first user account and the second user account belong to the wireless connection application. If it is detected that the first user account and the second user account are a same account, it is determined that the user equipment UE1 is the owner's device of the provider of the wireless routing device, and the network device returns the identity type information of the user equipment UE1 indicating that the user equipment UE1 is the owner's device to the wireless routing device. If it is detected that the first user account and the second user account are in a friend relationship, it is determined that the user equipment UE1 is the familiar device of the provider of the wireless routing device, and the network device returns the identity type information of the user equipment UE1 indicating that the user equipment UE1 is the familiar device to the wireless routing device. If it is detected that the first user account and the second user account are different accounts and are not in the friend relationship, it is determined that the user equipment UE1 is the unfamiliar device of the wireless routing device, and the network device returns the identity type information of the user equipment UE1 indicating that the user equipment is the limited device to the wireless routing device. After receiving the feedback information, if the wireless routing device determines that the user equipment UE1 is the owner's device or the familiar device, that is, the preferred device, the wireless routing device reallocates, to the user equipment UE1, the IP address of the priority scheduling IP address field whose speed and traffic are not limited. Alternatively, after receiving the feedback information, if the wireless routing device determines that the user equipment UE1 is the unfamiliar device, that is, the limited device, the wireless routing device maintains allocation, to the user equipment UE1, of the IP address of the limited scheduling IP address field whose speed and traffic are limited.

According to one aspect of this application, a method for performing traffic control on user equipment accessing a wireless access point is provided. The method includes:

sending, by a wireless routing device, a query request for identity type information of user equipment to a corresponding network device, wherein the query request includes device identification information of the user equipment, and the user equipment is connected to a shared wireless access point provided by the wireless muting device;

receiving, by the network device, the query request;

determining, by the network device, the identity type information of the user equipment according to the wireless routing device and the device identification information of the user equipment;

returning, by the network device, the identity type information of the user equipment to the wireless routing device;

receiving, by the wireless routing device, the identity type information; and preferentially scheduling, by the wireless routing device, traffic of the user equipment if the identity type information of the user equipment indicates that the user equipment is a preferred device, wherein the preferred device comprises an owner's device of a provider of the wireless routing device.

According to one aspect of this application, a device for performing traffic control on user equipment accessing a wireless access point is provided. The device includes:

a processor; and a memory configured to store a computer executable instruction that when being executed, causes the processor to perform:

determining identity type information of user equipment, the user equipment being connected to a shared wireless access point provided by a wireless routing device; and preferentially scheduling traffic of the user equipment if the identity type information of the user equipment indicates that the user equipment is a preferred device, wherein the preferred device comprises an owner's device of a provider of the wireless routing device.

According to another aspect of this application, a device for performing, at a wireless routing device side, traffic control on user equipment accessing a wireless access point is provided. The device includes:

a processor; and a memory configured to store a computer executable instruction that when being executed, causes the processor to perform:

receiving a connection request of user equipment for a shared wireless access point provided by a wireless routing device, and allocating an IP address in a limited scheduling IP address field to the user equipment;

determining the device identification information of the user equipment;

reallocating an IP address in a priority scheduling IP address field to the user equipment if the identity type information of the user equipment indicates that the user equipment is an owner's device or a familiar device of a provider of the wireless routing device.

According to another aspect of this application, a device for performing traffic control on user equipment accessing a wireless access point is provided. The device includes:

a processor; and a memory configured to store a computer executable instruction that when being executed, causes the processor to perform:

receiving a query request, sent by a corresponding wireless routing device, for identity type information of user equipment, the query request including device identification information of the user equipment, and the user equipment being connected to a shared wireless access point provided by the wireless routing device;

determining the identity type information of the user equipment according to the wireless routing device and the device identification information of the user equipment; and returning the identity type information of the user equipment to the wireless routing device.

According to one aspect of this application, a computer readable medium including an instruction is provided. The instruction, when being executed, causes a system perform the following operations:

determining identity type information of user equipment, the user equipment being connected to a shared wireless access point provided by a wireless routing device; and preferentially scheduling traffic of the user equipment if the identity type information of the user equipment indicates that the user equipment is a preferred device, wherein the preferred device comprises an owner's device of a provider of the wireless routing device.

According to another aspect of this application, a computer readable medium including an instruction is provided. The instruction, when being executed, causes a system to perform the following operations:

receiving a connection request of user equipment for a shared wireless access point provided by a wireless routing device, and allocating an IP address in a limited scheduling IP address field to the user equipment;

determining the device identification information of the user equipment;

reallocating an IP address in a priority scheduling IP address field to the user equipment if the identity type information of the user equipment indicates that the user equipment is an owner's device or a familiar device of a provider of the wireless routing device.

According to another aspect of this application, a computer readable medium including an instruction is provided. The instruction, when being executed, causes a system to perform the following operations:

receiving a query request sent by a corresponding wireless routing device for identity type information of user equipment, wherein the query request comprises device identification information of the user equipment, and the user equipment is connected to a shared wireless access point provided by the wireless routing device;

determining the identity type information of the user equipment according to the wireless routing device and the device identification information of the user equipment; and returning the identity type information of the user equipment to the wireless routing device.

It should be noted that, this application may be implemented in software and/or a combination of software and hardware, for example, may be implemented by using an application-specific integrated circuit(ASIC), a general purpose computer, or any other similar hardware device. In an embodiment, the software program in this application may be executed by using a processor to implement the foregoing steps or functions. Similarly, a software program (including a related data structure) in this application may be stored in a computer-readable recording medium such as a RAM, a magnetic or optical drive, a floppy disk, or other similar device. In addition, some steps or functions of this application may be implemented by using hardware, for example, a circuit that is used in combination with a processor to perform various steps or functions.

In addition, some of this application may be applied to a computer program product, for example, a computer program instruction. When the computer program instruction is executed by a computer, the computer is caused to operate to invoke or provide the method and/or the technical solution according to this application. A person skilled in the art should understand that a form of the computer program instruction in the computer-readable medium includes, but is not limited to, a source file, an executable file, an installation package file, and the like. Accordingly, a manner in which the computer program instruction is executed by the computer includes, but is not limited to: the computer directly executes the instruction, or the computer compiles the instruction and then executes the corresponding compiled program, or the computer reads and executes the instruction, or the computer reads and installs the instruction and then executes the corresponding installed program. In this case, the computer-readable medium may be any available computer readable-storage medium or communication medium that can be accessed by the computer.

Communication media include media that can be transferred from one system to another system by communication signals including, for example, computer-readable instructions, data structures, program modules, or other data.

Communication media may include conductive transmission media (such as cables and wires (for example, fiber optics, coaxial, and the like)) and wireless (transmission without conduction) media capable of propagating energy waves such as acoustic, electromagnetic, RF, microwave, and infrared. Computer readable instructions, data structures, program modules, or other data may be embodied, for example, as modulated data signals in a wireless medium (such as a carrier wave or a similar mechanism embodied as a part of the spread spectrum technology). The term "modulated data signal" refers to a signal whose one or more features are altered or set in such a manner as to encode information in the signal. Modulation may be analog, digital or hybrid modulation techniques.

As an example instead of limitation, the computer-readable storage medium includes volatile and non-volatile media, and removable and non-removable media implemented by using any method or technology for storing information such as computer-readable instructions, data structures, program modules, or other data. For example, the computer-readable storage medium includes, but is not limited to, volatile memories such as random access memories (RAM, DRAM, SRAM); and nonvolatile memories such as a flash memory, various read only memories (ROM, PROM, EPROM, EEPROM), magnetic and feromagnetic/ferroelectric memories (MRAM, FeRAM); and magnetic and optical storage devices (hard disk, magnetic tape, CD, DVD); or other currently known media or media developed in the future and capable of storing computer-readable information/data used by computer systems.

In this case, an embodiment according to this application includes a device, and the device includes a memory for storing computer program instructions and a processor for executing program instructions. When the computer program instructions are executed by the processor, the device is triggered to perform the methods and/or technical solutions based on the foregoing embodiments according to this application.

It is apparent to a person skilled in the art that this application is not limited to details in the foregoing exemplary embodiments, and this application can be implemented in another specific form without departing from the spirit or basic features of this application. Therefore, the embodiments should be considered to be exemplary in all respects and not limitative. The scope of this application is not defined by the foregoing description but by the appended claims. This application is intended to include all the variations that are equivalent in significance and scope to the claims. No reference numerals in the claims should be considered as limitations to the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. A method for performing, at a wireless routing device side, traffic control on a user equipment accessing a wireless access point, comprising steps of:
a step of determining identity type information of the user equipment, the user equipment being connected to a shared wireless access point provided by a wireless routing device, wherein the step of determining identity type information of the user equipment comprises:
corresponding a first user account to the user equipment accessing the shared wireless access point in a wireless connection application,
corresponding a second user account to a provider of the wireless routing device in the wireless connection application,
detecting whether the first user account and the second user account are a same account,
determining the user equipment as a preferred device when the first user account and the second user account are the same account;
and
preferentially scheduling traffic of the user equipment if the identity type information of the user equipment indicates that the user equipment is the preferred device, wherein the preferred device comprises an owner's device of the provider of the wireless routing device.

2. The method according to claim 1, further comprising:
limiting scheduling of the traffic of the user equipment according to a traffic requirement of the preferred device in the wireless routing device if the identity type information of the user equipment is a limited device.

3. The method according to claim 2, wherein the preferred device further comprises a familiar device of the provider of the wireless routing device.

4. The method according to claim 2, wherein the step of preferentially scheduling traffic of the user equipment if the identity type information of the user equipment indicates that the user equipment is a preferred device, comprises:
allocating an IP address in a priority scheduling IP address field to the user equipment if the identity type information of the user equipment indicates that the user equipment is the preferred device.

5. The method according to claim 1, wherein the step of determining identity type information of the user equipment, comprises:
sending a query request for the identity type information of the user equipment to a corresponding network device, wherein the query request comprises device identification information of the user equipment; and
receiving the identity type information of the user equipment returned by the network device based on the query request.

6. The method according to claim 5, wherein the preferred device further comprises a familiar device of the provider of the wireless routing device.

7. The method according to claim 5, wherein the step of preferentially scheduling traffic of the user equipment if the identity type information of the user equipment indicates that the user equipment is a preferred device, comprises:
allocating an IP address in a priority scheduling IP address field to the user equipment if the identity type information of the user equipment indicates that the user equipment is the preferred device.

8. The method according to claim 1, wherein the preferred device further comprises a familiar device of the provider of the wireless routing device.

9. The method according to claim 8, wherein the step of preferentially scheduling traffic of the user equipment if the identity type information of the user equipment indicates that the user equipment is a preferred device, comprises:
allocating an IP address in a priority scheduling IP address field to the user equipment if the identity type information of the user equipment indicates that the user equipment is the preferred device.

10. The method according to claim 1, wherein the step of preferentially scheduling traffic of the user equipment if the identity type information of the user equipment indicates that the user equipment is a preferred device, comprises:
- allocating an IP address in a priority scheduling IP address field to the user equipment if the identity type information of the user equipment indicates that the user equipment is the preferred device.

11. The method according to claim 10, further comprising:
- allocating an IP address in a limited scheduling IP address field to the user equipment if the identity type information of the user equipment indicates that the user equipment is the limited device.

12. A method for performing, at a network device side, traffic control on a user equipment accessing a wireless access point, comprising steps of:
- receiving a query request, sent by a corresponding wireless routing device, for identity type information of the user equipment, wherein the query request comprises device identification information of the user equipment, and the user equipment is connected to a shared wireless access point provided by the wireless routing device;
- determining the identity type information of the user equipment according to the wireless routing device and the device identification information of the user equipment; and
- returning the identity type information of the user equipment to the wireless routing device;
- wherein traffic control on the user equipment at the wireless routing device side is performed by the method of claim 1.

13. The method according to claim 12, wherein the step of determining the identity type information of the user equipment according to the wireless routing device and the device identification information of the user equipment, comprises:
- performing a matching query in an owner's device of a provider of the wireless routing device according to the identity type information of the user equipment; and
- if the query is matched, determining that the identity type information of the user equipment indicates that the user equipment is the owner's device of the provider of the wireless routing device.

14. The method according to claim 12, wherein the step of determining the identity type information of the user equipment according to the wireless routing device and the device identification information of the user equipment, comprises:
- determining a first user account corresponding to the user equipment according to the device identification information of the user equipment and a mapping relationship between a user and a device, wherein the first user account corresponds to the user equipment in the mapping relationship between the user and the device; and
- determining the identity type information of the user equipment according to a second user account that corresponds to the wireless routing device and the first user account.

15. The method according to claim 14, wherein the step of determining the identity type information of the user equipment according to the second user account that corresponds to the wireless routing device and the first user account, comprises:
- determining the identity type information of the user equipment according to the second user account that corresponds to the wireless routing device and the first user account and an identity determining rule, wherein the identity determining rule comprises at least one of the following:
- if the first user account and the second user account are corresponding to a same user, determining that the identity type information of the user equipment indicates that the user equipment is the owner's device of the provider of the wireless routing device; or
- if the first user account and the second user account are in a friend relationship, determining that the identity type information of the user equipment indicates that the user equipment is a familiar device of the provider of the wireless routing device; or
- if the first user account and the second user account are different users and are not in a friend relationship, determining that the identity type information of the user equipment indicates that the user equipment is a limited device.

16. The method according to claim 15, the method further comprising:
- when a login log shows that a user logs into a corresponding application in the user equipment by using the first user account, establishing a correspondence between the user equipment and the first user account, to establish or update the mapping relationship between the user and the device.

17. The method according to claim 14, the method further comprising:
- when a login log shows that a user logs into a corresponding application in the user equipment by using the first user account, establishing a correspondence between the user equipment and the first user account, to establish or update the mapping relationship between the user and the device.

18. The method according to claim 17, wherein the step of determining the identity type information of the user equipment according to the second user account that corresponds to the wireless routing device and the first user account, comprises:
- determining the second user account corresponding to the wireless routing device according to a third user account corresponding to the wireless routing device, wherein the first user account and the second user account belong to a same application, and the second user account and the third user account belong to different applications; and
- determining the identity type information of the user equipment according to the first user account and the second user account.

19. The method according to claim 14, wherein the step of determining the identity type information of the user equipment according to the second user account that corresponds to the wireless routing device and the first user account, comprises:
- determining the second user account corresponding to the wireless routing device according to a third user account corresponding to the wireless routing device, wherein the first user account and the second user account belong to a same application, and the second user account and the third user account belong to different applications; and
- determining the identity type information of the user equipment according to the first user account and the second user account.

20. A method for performing, at a wireless routing device side, traffic control on a user equipment accessing a wireless access point, comprising steps of:
- receiving a connection request of the user equipment for a shared wireless access point provided by a wireless routing device, and allocating an IP address in a limited scheduling IP address field to the user equipment;
- a step of determining device identification information of the user equipment, wherein the step of determining device identification information of the user equipment comprises:
- corresponding a first user account to the user equipment accessing the shared wireless access point in a wireless connection application,
- corresponding a second user account to a provider of the wireless routing device in the wireless connection application,
- detecting whether the first user account and the second user account are a same account,
- determining the user equipment as a preferred device or a familiar device when the first user account and the second user account are the same account; and
- reallocating an IP address in a priority scheduling IP address field to the user equipment if the identity type information of the user equipment indicates that the user equipment is an owner's device or the familiar device of the provider of the wireless routing device.

* * * * *